(12) United States Patent
Emery

(10) Patent No.: US 11,621,455 B2
(45) Date of Patent: Apr. 4, 2023

(54) VENT ASSEMBLY WITH MEMBRANE (71) Applicant: SAFT AMERICA, Cockeysville, MD (US)

(72) Inventor: Alain Emery, Hahira, GA (US)

(73) Assignee: SAFT AMERICA, Cockeysville, MD (US)

(*) Notice: Subject to any disclaimer, the term of this patent is extended or adjusted under 35 U.S.C. 154(b) by 176 days.

(21) Appl. No.: 16/725,669

(22) Filed: Dec. 23, 2019

(65) Prior Publication Data
US 2021/0193981 A1 Jun. 24, 2021

(51) Int. Cl.
H01M 50/317 (2021.01)
H01M 50/30 (2021.01)

(52) U.S. Cl.
CPC ....... H01M 50/317 (2021.01); H01M 50/394 (2021.01)

(58) Field of Classification Search
None
See application file for complete search history.

(56) References Cited

U.S. PATENT DOCUMENTS

| | | | |
|---|---|---|---|
| 3,941,149 A | 3/1976 | Mittleman | |
| 4,002,495 A * | 1/1977 | Hakarine | H01M 50/394 429/87 |
| 4,181,145 A | 1/1980 | Mitchell | |
| 4,636,446 A * | 1/1987 | Lee | H01M 50/308 429/54 |
| 4,756,982 A | 7/1988 | McCartney et al. | |
| 5,981,099 A * | 11/1999 | Bourbeau | H01M 50/394 429/82 |
| 6,120,931 A * | 9/2000 | Fossati | H01M 50/394 429/72 |
| 6,294,282 B1 | 9/2001 | Misra et al. | |
| 6,298,873 B1 | 10/2001 | Levey et al. | |
| 7,101,640 B1 * | 9/2006 | Kump | H01M 50/308 429/72 |
| 2005/0208369 A1 * | 9/2005 | Puhlick | H01M 8/1231 429/53 |
| 2012/0094182 A1 * | 4/2012 | Hirose | H01M 4/73 429/241 |
| 2012/0177962 A1 * | 7/2012 | Streuer | H01M 50/60 429/89 |

(Continued)

FOREIGN PATENT DOCUMENTS

EP 2 453 502 A1 5/2012
EP 3329528 A1 6/2018
(Continued)

Primary Examiner — Amanda J Barrow
(74) Attorney, Agent, or Firm — Sughrue Mion, PLLC (57) ABSTRACT A vent assembly for a battery or a electrochemical cell may include a vent body configured to connect to a battery casing or a electrochemical cell body, a flame arrester and/or a pressure valve disposed in the vent body, a membrane disposed in the vent body between a vent opening of the battery or the electrochemical cell and the flame arrester and/or the pressure valve, and that is configured to shield the flame arrester and/or the pressure valve from electrolyte solution of the battery or the electrochemical cell, and a seal disposed between the vent body and the membrane. Also, a battery including a vent assembly.

6 Claims, 6 Drawing Sheets (56) References Cited

U.S. PATENT DOCUMENTS

| | | | | |
|---|---|---|---|---|
| 2014/0141292 A1* | 5/2014 | Lee | ................... | H01M 10/121 |
| | | | | 429/54 |
| 2016/0190655 A1* | 6/2016 | Fegely | ................... | F16K 47/08 |
| | | | | 429/55 |
| 2017/0077472 A1* | 3/2017 | Ishii | ....................... | H01G 11/80 |
| 2017/0271092 A1* | 9/2017 | Ishii | ................... | H01M 50/394 |
| 2019/0097202 A1* | 3/2019 | Morone | ................ | H01M 50/22 |

FOREIGN PATENT DOCUMENTS

| | | |
|---|---|---|
| WO | 2013/136136 A1 | 9/2013 |
| WO | 2016/180972 A1 | 11/2016 |
| WO | 2018/119242 A1 | 6/2018 |

* cited by examiner

VENT ASSEMBLY WITH MEMBRANE

FIELD

The present disclosure relates to vented cells or batteries, with alkaline or acid electrolyte chemistry, and the use of an expanded polytetrafluoroethylene (ePTFE) membrane in the vent assembly to protect the flame arrester and/or the pressure valve from being contaminated by the electrolyte during service or during handling/transportation. A vent assembly with the correct ePTFE membrane sizing and grade, the correct elastomer, and the correct compression permits tight sealing around the ePTFE membrane.

BACKGROUND

On vented cells or batteries, a component (e.g., a flame arrester, a pressure valve, etc.) may be clogged, damaged based on electrolyte contamination when the vented cells or batteries are in service, handled, transported, etc.

SUMMARY

According to an aspect of the disclosure, a vent assembly for a battery or an electrochemical cell may include a vent body configured to connect to a battery casing or an electrochemical cell body; a component disposed in the vent body; a membrane disposed in the vent body between a vent opening of the battery or the electrochemical cell and the component, and that is configured to shield the component from electrolyte solution of the battery or the electrochemical cell; and a seal disposed between the vent body and the membrane.

According to an aspect of the disclosure, a vent assembly may include a component disposed in a vent opening of a battery casing of a battery or a cell body of an electrochemical cell; a membrane disposed in the vent opening, and that is configured to shield the component from electrolyte solution of the battery or the electrochemical cell; and a seal. The membrane may be disposed between the seal and the component.

According to an aspect of the disclosure, a battery may include a plurality of electrochemical cells; a casing to contain the electrochemical cells; and a vent assembly.

According to an aspect of the disclosure, a battery may include a plurality of electrochemical cells that each may include a vent at one end of the cell.

DETAILED DESCRIPTION

The following detailed description of example implementations refers to the accompanying drawings. The same reference numbers in different drawings may identify the same or similar elements.

Figure 1:
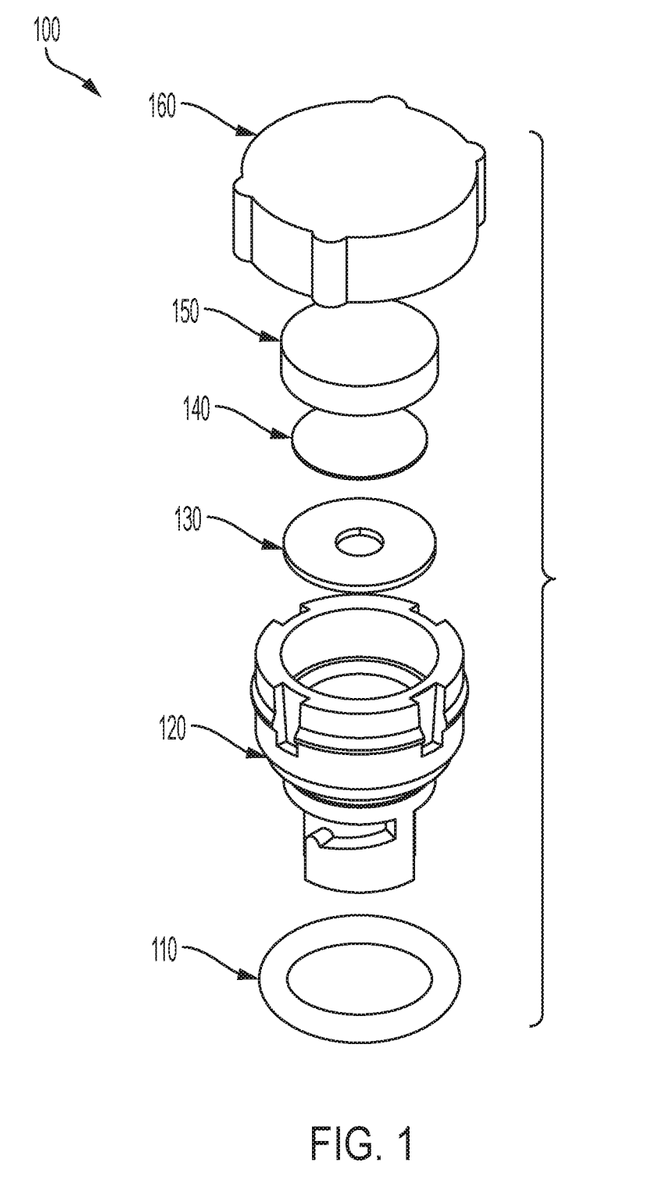
FIG. 1 is an exploded view of a vent assembly according to an embodiment.

FIG. 1 is an exploded view of a vent assembly according to an embodiment. As shown in FIG. 1, a vent assembly 100 according to an embodiment may include a seal 110, a vent body 120, an elastomeric seal 130, a membrane 140, a component 150, and a vent cover 160.

The vent assembly 100 may be configured to be used in conjunction with a battery, an electrochemical cell, etc. and may be removable. The vent assembly is adapted for being used in conjunction with a battery comprising one or more electrochemical cells containing an electrolyte, such as a NiCd electrolyte. Any kind of alkaline electrolyte, such as a NiFe, NiZn, NiMH electrolyte or lead-acid electrolyte, may also be used. For example, the vent assembly 100 may be connected to a battery casing, an electrochemical cell body, etc. The cell body refers to the set of parts enclosing an electrochemical cell, a cell container or a cell can and a cell cover.

The seal 110 may be configured to seal the vent body 120 and a battery casing. For example, the seal 110 may be disposed between a battery casing or cell body and the vent body 120, and may seal the vent body 120 and the battery casing from internal and external substances. The seal 110 may be comprised of any suitable material, such as synthetic polyisoprene, polybutadiene, silicone rubber, etc.

The vent body 120 may be configured to connect to a battery casing, an electrochemical cell body, etc. For example, the vent body 120 may include a bottom portion that is configured to connect to a battery casing via a locking mechanism, a press-fit mechanism, an adhesive, etc. The vent body 120 may be comprised of any suitable material, such as a metal, a plastic, or the like.

The vent body 120 may be configured to accommodate the elastomeric seal 130, the membrane 140, and the component 150. For example, the vent body 120 may include an intermediate portion in which the elastomeric seal 130, the membrane 140, and the component 150 are disposed.

The vent body 120 may be configured to connect to the vent cover 160. For example, the vent body 120 may include a top portion that is configured to connect to the vent cover 160 via a locking mechanism, a press-fit mechanism, an adhesive, etc.

The elastomeric seal 130 may be configured to support the membrane 140 within the vent body 120. For example, the elastomeric seal 130 may support the membrane 140 such that the membrane 140 remains substantially stationary within the vent body 120. In this way, the membrane 140 may be supported in the vent body 120 via the elastomeric seal 130, instead of being thermo-welded or adhered via adhesive because such techniques might not be possible with the presence of corrosive electrolyte.

The elastomeric seal 130 may be comprised of any suitable material, such as silicone rubber, silicone foam, rubber, ethylene propylene rubber, etc. The elastomeric seal 130 may be directly connected to the vent body 120. Alternatively, the elastomeric seal 130 may be integrated with the vent body 120, such that the vent body 120 and the elastomeric seal 130 constitute a single material and member. Alternatively, the elastomeric seal 130 may be directly connected to the membrane 140. Alternatively, the elastomeric seal 130 may be directly connected to the component 150. Alternatively, the elastomeric seal 130 may be integrated with the component 150, such that the component 150 and the elastomeric seal 130 constitute a single material and member.

As shown in FIG. 1, the elastomeric seal 130 may be annular. Alternatively, the elastomeric seal 130 may be any suitable shape that permits the elastomeric seal 130 to support the membrane 140 within the vent body 120.

The membrane 140 may be configured to shield the component 150 from electrolyte solution of the battery or the electrochemical cell. For example, the membrane 140 may shield the component 150 from electrolyte solution of the battery or the electrochemical cell during transport, service, etc. of the battery, such that contamination and/or corroding of the component 150 may be mitigated.

The membrane 140 may be a synthetic fluoropolymer of tetrafluoroethylene that exhibits hydrophobic, non-wetting, heat-resistant, etc. properties. By being disposed between the electrolyte solution of the battery and the component 150, the membrane 140 may prevent the electrolyte solution in vapor or liquid form, from contacting, damaging, corroding, clogging, etc. the component 150 (e.g., during transport, based on the battery being inverted, during usage, etc.). Further, the membrane 140 may permit the component 150 to retain functionality and may let gazes (hydrogen and oxygen) escape from the battery or the electrochemical cell.

The membrane 140 may be comprised of any suitable material. For example, the membrane 140 may be comprised of polytetrafluoroethylene (PTFE), expanded polytetrafluoroethylene (ePTFE), etc.

The component 150 may be a flame arrester, a pressure valve, or the like. The vent cover 160 may be configured to cover the vent body 120. For example, the vent cover 160 may connect to the vent body 120 via a locking mechanism, press-fit, an adhesive, etc.

As shown, the vent assembly 100 may include a vent body 120 connected to a battery container, and an elastomeric seal 130, a membrane 140, and a component 150 disposed within the vent body 120. The vent cover 160 may cover the vent body 120. In this way, the membrane 140 may be disposed within the vent body 120 between the component 150 and the elastomeric seal 130 with adequate compression, such that the membrane 140 may shield the component 150 from electrolyte solution of the battery.

Figure 2:
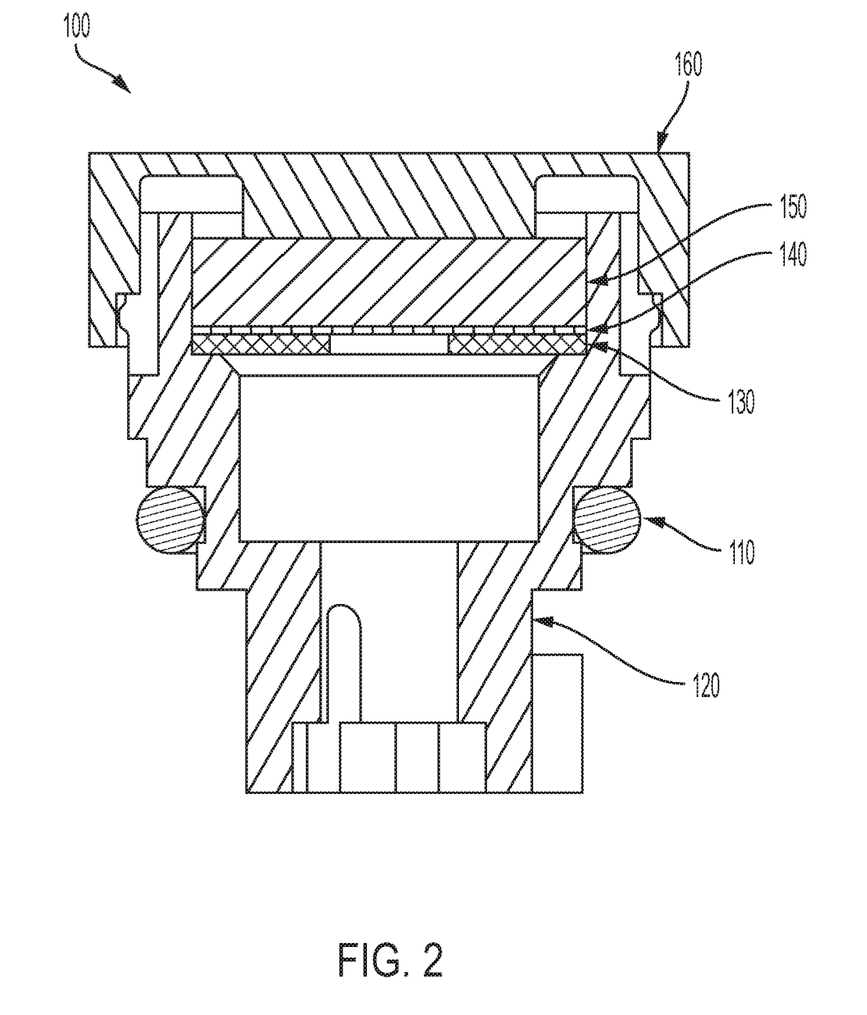
FIG. 2 is a cross-section view of the vent assembly of FIG. 1.

FIG. 2 is a cross-section view of the vent assembly of FIG. 1. As shown in FIG. 2, the vent assembly 100 may include the seal 110 disposed between a battery container and an outer surface of the vent body 120, the vent body 120, the elastomeric seal 130 disposed within the vent body 120, the membrane 140 disposed on the elastomeric seal 130, the component 150 disposed on the membrane 140, and the vent cover 160 connected to the vent body 120.

As shown in FIG. 2, the vent body 120 may include an internal recess that houses the elastomeric seal 130, the membrane 140, and the component 150. As shown, the vent body 120 may include an internal flanged surface that permits the elastomeric seal 130 to be supported by the vent body 120. The membrane 140 may be disposed on the elastomeric seal 130, and the component 150 may be disposed on the membrane. The vent cover 160 may compress the component 150, the membrane 140, and the elastomeric seal 130. In this way, the membrane 140 may be disposed within the vent body 120 between the component 150 and the elastomeric seal 130 with adequate compression, such that the membrane 140 may shield the component 150 from electrolyte solution of the battery.

Figure 3:
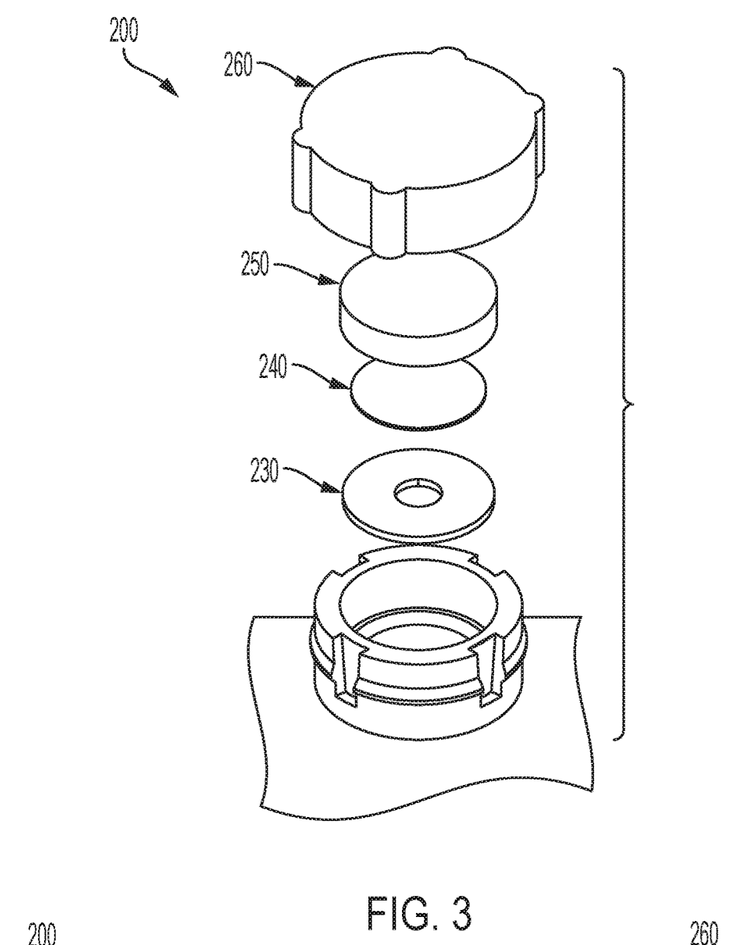
FIG. 3 is an exploded view of a vent assembly according to an embodiment.

FIG. 3 is a perspective view of a vent assembly according to an embodiment. As shown in FIG. 3, a vent assembly 200 may include an elastomeric seal 230, a membrane 240, a component 250, and a vent cover 260.

The elastomeric seal 230, membrane 240, component 250, and vent cover 260 may be substantially the same as the elastomeric seal 130, the membrane 140, the component 150, and the vent cover 160 described above in connection with FIG. 1.

A battery casing or cell body may include a portion that is configured to accommodate the elastomeric seal 230, membrane 240, and the component 250. In this way, the membrane 240 may be disposed within a battery casing or cell body between the component 250 and the elastomeric seal 230 with adequate compression, such that the membrane 240 may shield the component 250 from electrolyte solution of the battery.

Figure 4:
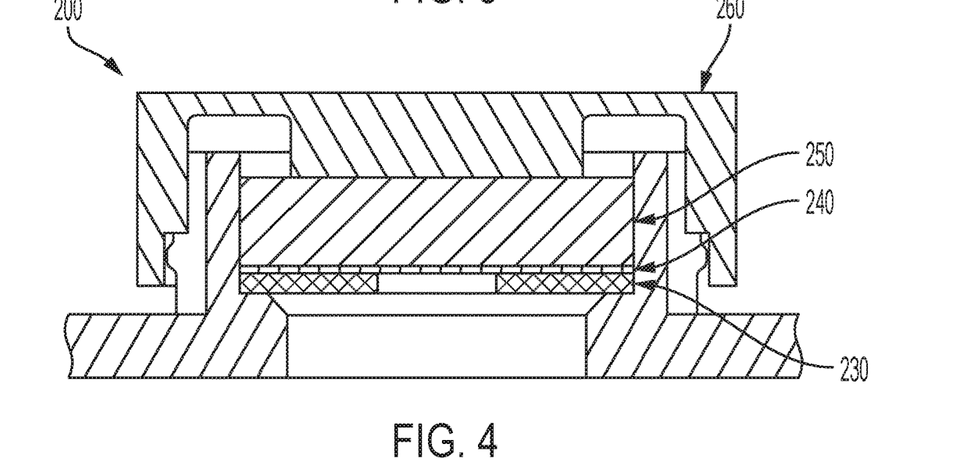
FIG. 4 is a cross-section view of the vent assembly of FIG. 3.

FIG. 4 is a cross-section view of the vent assembly of FIG. 3. As shown in FIG. 4, the vent assembly 200 may include the elastomeric seal 230 that is disposed on an internal flanged surface of a battery casing or cell body, the membrane 240 that is disposed on the elastomeric seal 230, the component 250 that is disposed on the membrane 240, and the vent cover 260.

Figure 5:
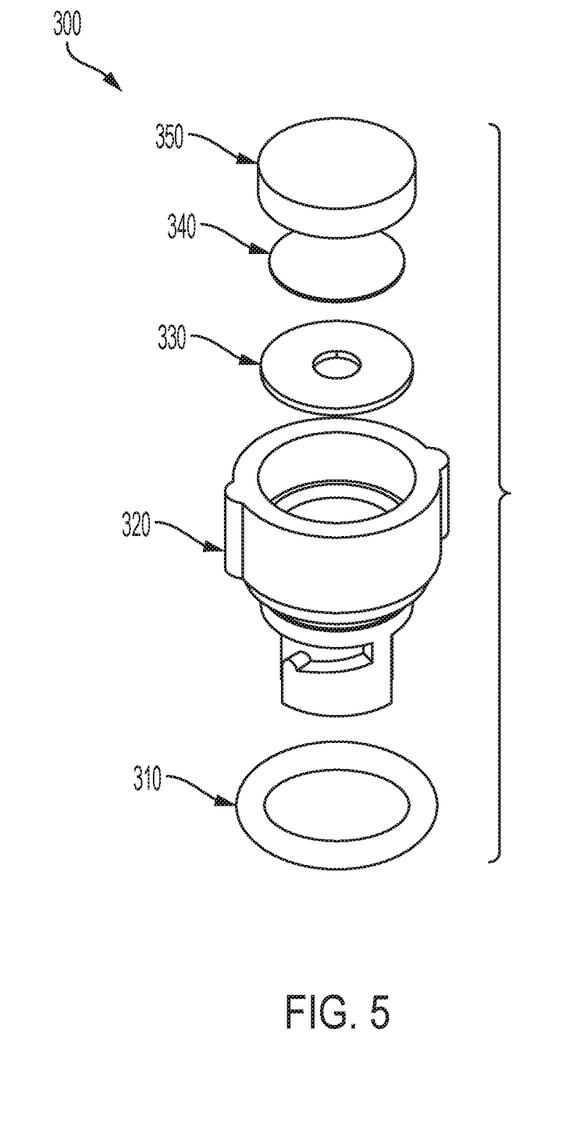
FIG. 5 is an exploded view of a vent assembly according to an embodiment.

FIG. 5 is an exploded view of a vent assembly according to an embodiment. As shown in FIG. 5, a vent assembly 300 may include a seal 310, a vent body 320, an elastomeric seal 330, a membrane 340, and a component 350. The vent assembly 300 may be substantially the same as the vent assembly 100, except that the vent assembly 300 might not include a vent cover.

The component 350 may be configured to connect to the vent body 320. For example, the component 350 may include a portion that is configured to connect to the vent body 320 via a locking mechanism, a press-fit mechanism, an adhesive, etc.

Figure 6:
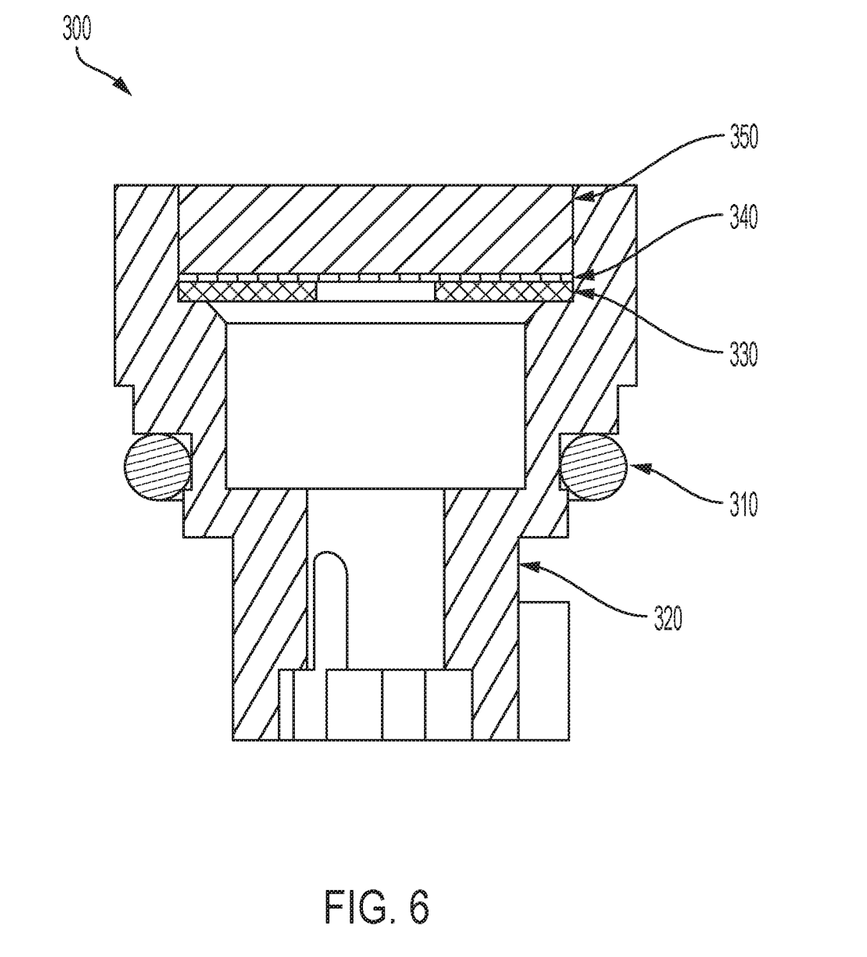
FIG. 6 is a cross-section view of the vent assembly of FIG. 5.

FIG. 6 is a cross-section view of the vent assembly of FIG. 5. As shown in FIG. 6, the vent assembly 300 may include the seal 310 disposed between a battery container and an outer surface of the vent body 320, the elastomeric seal 330 disposed on an internal flanged surface of the vent body 320, the membrane 340 disposed on the elastomeric seal 330, and the component 350 disposed on the membrane 340.

Figure 7:
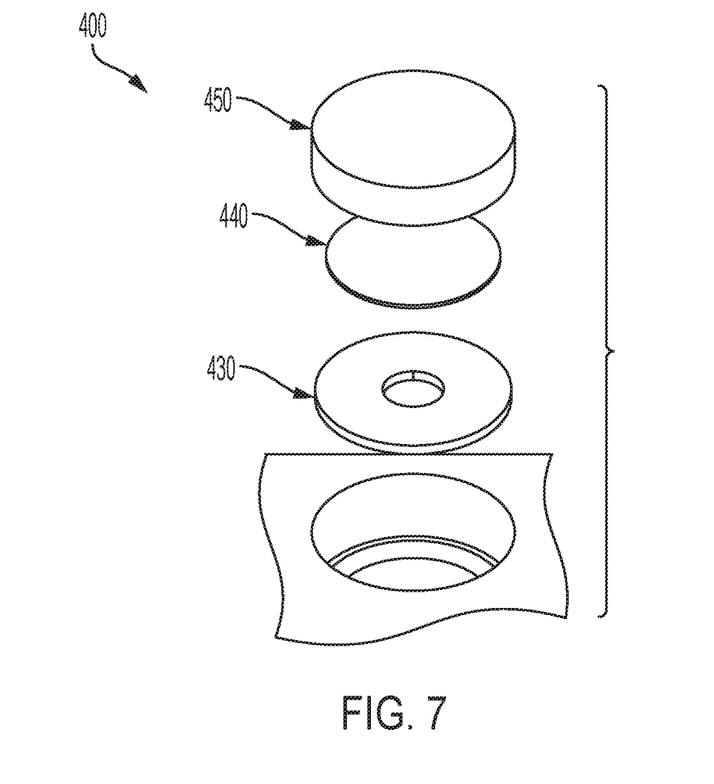
FIG. 7 is an exploded view of a vent assembly according to an embodiment.

FIG. 7 is an exploded view of a vent assembly according to an embodiment. As shown in FIG. 7, a vent assembly 400 may include an elastomeric seal 430, a membrane 440, and a component 450. A battery casing or cell body may include an opening that is configured to accommodate the elastomeric seal 430, the membrane 440, and the component 450.

The component 450 may be configured to connect to the battery casing or cell body. For example, the component 450 may include a portion that is configured to connect to the battery casing or cell body via a locking mechanism, a press-fit mechanism, an adhesive, etc.

Figure 8:
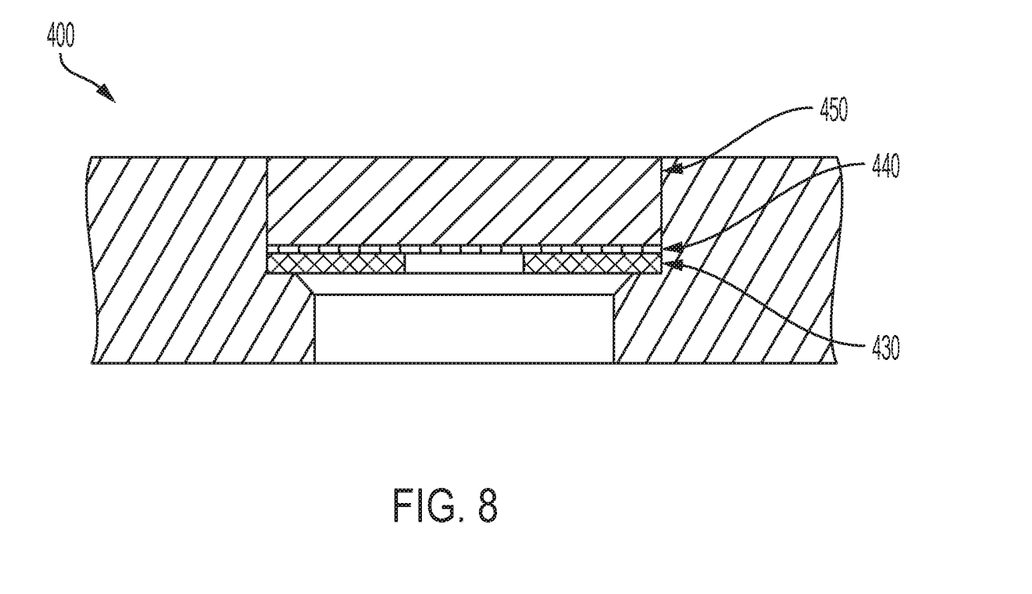
FIG. 8 is a cross-section view of the vent assembly of FIG. 7.

FIG. 8 is a cross-section view of the vent assembly of FIG. 7. As shown in FIG. 8, the elastomeric seal 430 may be disposed within a battery casing or cell body, and may be disposed on an internal flanged surface of the battery casing or cell body. The membrane 440 may be disposed on the elastomeric seal 430, and the component 450 may be disposed on the membrane 440.

Experimental testing was performed using a vent assembly as described herein. For a transportation test, a cell was positioned in an inverted state for seven days at a temperature of 65°±5° C., and was filled with 25.4 mm of 30% KOH electrolyte solution. The vent assembly did not exhibit leakage.

Further, experimental testing was performed using NiCd batteries under constant potential (floating voltage), under uncontrolled climate, and with annual average humidity 25% and temperature in excess of 39° C. (103° F.). During this testing, the vent assembly did not exhibit an increasing in back-pressure.

Further, experimental testing was performed in accordance with the UL 1989 standard. The vent assembly exhibited conformance with the UL 1989 standard.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A vent assembly for a battery or an electrochemical cell, the vent assembly comprising:
    a vent body configured to connect to a battery casing or a cell body, the vent body including an internal recess that houses an elastomeric seal, a membrane and a component,
    the elastomeric seal, the membrane and the component being entirely contained in the internal recess,
    the vent body including an internal flanged surface that permits the elastomeric seal to be supported by the vent body;
    a vent cover configured to cover a vent opening of the battery or the electrochemical cell, configured to connect to the vent body via a locking mechanism or a press-fit mechanism or an adhesive, and to cover the vent body, the vent cover being disposed on the component;
    the membrane being comprised of polytetrafluoroethylene (PTFE) or expanded polytetrafluoroethylene (ePTFE) and disposed in the vent body between the vent opening of the battery or the electrochemical cell and the component, and that is configured to shield the component from electrolyte solution of the battery or the cell; and
    the elastomeric seal being disposed on the internal flanged surface of the vent body between the vent opening and the membrane, the elastomeric seal being directly connected to the membrane,
    the membrane being disposed on the elastomeric seal, the component being disposed on the membrane, and wherein the elastomeric seal, the membrane and the component abut on the internal flanged surface of the vent body and the vent cover compresses the component, the membrane and the elastomeric seal.

2. The vent assembly of claim 1, wherein the component comprises a flame arrester, and wherein the membrane is disposed between the vent opening of the battery or the electrochemical cell and the flame arrester.

3. The vent assembly of claim 1, wherein the component comprises a pressure valve, and wherein the membrane is disposed between the vent opening of the battery or the electrochemical cell and the pressure valve.

4. The vent assembly of claim 1, wherein the component comprises a flame arrester and a pressure valve, and wherein the membrane is disposed between the vent opening of the battery or the electrochemical cell and the pressure valve and the flame arrester.

5. A battery comprising:
    a plurality of electrochemical cells;
    a casing to contain the electrochemical cells; and
    a vent assembly according to claim 1.

6. An electrochemical cell assembly comprising:
    an electrochemical cell;
    a body to contain the electrochemical cell; and
    a vent assembly according to claim 1.

* * * * *